(12) United States Patent
Condon

(10) Patent No.: US 6,454,988 B1
(45) Date of Patent: Sep. 24, 2002

(54) INDEXING LABELING MAGAZINE

(75) Inventor: Bart D. Condon, Holland, OH (US)

(73) Assignee: Autotec, Inc., Sylvania, OH (US)

( * ) Notice: Subject to any disclaimer, the term of this patent is extended or adjusted under 35 U.S.C. 154(b) by 0 days.

(21) Appl. No.: 09/717,596

(22) Filed: Nov. 21, 2000

Related U.S. Application Data

(62) Division of application No. 09/145,622, filed on Sep. 2, 1998, now Pat. No. 6,153,143.
(60) Provisional application No. 60/068,795, filed on Dec. 24, 1997, now abandoned.

(51) Int. Cl.[7] .......................... B29C 49/24; B29C 49/48
(52) U.S. Cl. ..................... 264/509; 264/511; 425/504; 425/126.1; 425/538
(58) Field of Search .................. 264/509, 511, 264/573, 510; 425/126.1, 504, 522, 523, 538

(56) References Cited

U.S. PATENT DOCUMENTS

| | | | |
|---|---|---|---|
| 4,479,771 A | 10/1984 | Slat et al. | 425/503 |
| 4,585,408 A | 4/1986 | Darr | 425/171 |
| 4,595,449 A | 6/1986 | Nowicki | 156/444 |
| 4,639,206 A * | 1/1987 | Darr | 425/503 |
| 4,639,207 A | 1/1987 | Slat et al. | 425/503 |
| 4,680,000 A * | 7/1987 | Nowicki et al. | 425/126 R |
| 4,721,451 A | 1/1988 | Darr | 425/503 |
| 4,815,955 A | 3/1989 | Krall | 425/116 |
| 4,824,630 A * | 4/1989 | Mohney | 264/509 |
| 4,834,641 A * | 5/1989 | Keyser | 425/503 |
| 4,909,723 A * | 3/1990 | Slat et al. | 264/509 |
| 4,954,070 A * | 9/1990 | Dunlap | 425/522 |
| 5,919,498 A * | 7/1999 | Weber et al. | 264/538 |
| 6,060,012 A * | 5/2000 | Weber et al. | 264/334 |
| 6,193,925 B1 * | 2/2001 | Weber et al. | 264/509 |
| 6,264,876 B1 * | 7/2001 | Ballay | 264/509 |

FOREIGN PATENT DOCUMENTS

EP        0 352 385        1/1990

* cited by examiner

Primary Examiner—Angela Ortiz
(74) Attorney, Agent, or Firm—Emch, Schaffer, Schaub & Porcello, Co., L.P.A.

(57) ABSTRACT

A method and apparatus for applying labels to cylindrical portions of plastic bottles by in-mold labeling utilizes an indexing label magazine which dispenses labels to first label engaging heads and, following indexing of said label magazine, dispenses labels to second label engaging heads.

7 Claims, 4 Drawing Sheets

INDEXING LABELING MAGAZINE

CROSS REFERENCE TO RELATED APPLICATION

This application is a division of Ser. No. 09/145,622 filed Sep. 2, 1998, now U.S. Pat. No. 6,153,143 and is based upon Provisional Patent Application Serial No. 60/068,795 filed Dec. 24, 1997, now abandoned.

The present invention relates a label machine for in-mold labeling of plastic bottles having a circular cross-section configuration, a major portion of which defines a cylinder. In-mold labeling refers to a processes and apparatus for affixing labels to articles such as plastic bottles during the molding process by inserting labels in the recess of a mold section, closing a pair of mold sections around a length of heated, plasticized tubing and expanding such tubing into conformity with the mold cavity defined by the recesses of the closed mold sections thereby causing the label to become affixed to the wall of the newly blown bottle.

BACKGROUND OF THE INVENTION

The prior art discloses many types of methods and apparatus for accomplishing in-mold labeling of plastic bottles. For example, U.S. Pat. No. 5,350,483, which is incorporated herein by reference, discloses an in-mold labeling insertion apparatus and method according to which there is provided a carriage carrying at least one label holder. The carriage is moved in unison with the mold along a parallel path with the face of the open mold section. The carriage has a label inserting beam extending forwardly therefrom and a label holder operable to (1) receive a label from a label magazine and (2) release the label on the wall of the recess of one of the mold sections upon advancement of the carriage and insertion of the beam and label holder thereon between said open mold sections. Other methods and apparatus for in-mold labeling are shown in U.S. Pat. Nos. 4,639,206; 4,355,967; 4,479,770 and 4,479,771.

In the blow molding of plastic bottles, it is desirable to utilize blow molds having a plurality of molding cavities so that a plurality of bottles are molded in each molding cycle of a set of blow molds. The blow molds utilize first and second sections which open and close. Recesses are formed in the mating faces of each of the mold sections. When the mold sections are closed, the recesses cooperate to define cavities in which the bottles are blown. Heretofore there has not been widespread use of in-mold labeling for bottles having a cylindrical body portion, particularly in those situations where it is desired that substantially the entire circumference of the bottle be encircled by labels from the mating mold sections. In order to affix labels which substantially encircle the entire circumference of a cylindrical portion of a bottle, each mold section should have inserted in its mold recess a label having a length equal to the circumferential wall portion of such mold recess. Since two mold sections are normally utilized in blow molding a plastic bottle, the circumferential length of the cylindrical portion of a recess of each mold section will be equal to one-half of the circumference of the cylindrical portion of the bottle being formed. Accordingly, the length of a label to be inserted in each mold section recess will be equal to or substantially equal to one-half of such bottle cylindrical portion circumference.

As mentioned previously, it is frequently desirable to utilize blow molds having a plurality of molding cavities aligned with one another with a single tubular parison being blown in each such molding cavity simultaneously with other parisons being blown in their respective cavities while the mold sections are closed therearound. Depending upon the size of the bottles being blown and the type of machine, there may be 2, 4, 6 or even 8 aligned bottles being blown simultaneously. In order to minimize the space occupied by the blow molding machine, it is desirable that each of the cavities be positioned as close to the adjacent cavities as feasible. Such close positioning of the cavities will also minimize the amount of metal required to be utilized in the molds and related equipment and minimize the amount of energy required (1) to move the mold sections between open and closed positions and, (2) depending upon the type of blow molding machine, to move the mold sections laterally from a position beneath an extrusion die orifice for receiving a plurality of tubular parisons to a position at which air is introduced therein to expand the parisons in their respective mold cavities. However, the closeness of the positioning of adjacent mold cavities results in the distance between adjacent mold cavities being significantly less than the length of a label having a length equal to one-half the circumference of the cylindrical portion of bottle being molded. It should be noted that the labels are substantially flat or planar when they are removed from a label magazine by a label transfer mechanism which transfers the labels from the label magazine to the mold recesses. As a result of the length of such labels, when flat, being greater than the distance between adjacent mold cavities, it is necessary that the labels being carried by adjacent transfer mechanisms have overlapping edges. As well be appreciated, such lengths of the labels in relation to the spacing between the mold cavities does not permit the simultaneous utilization of separate label magazines aligned with each mold recess.

SUMMARY OF THE INVENTION

Under the present invention, a label dispensing magazine having multiple lanes for dispensing labels is provided with a magazine shuttle to shuttle the labels and magazines from a first position aligned with one vacuum label holding head to a second position aligned with an adjacent vacuum label holding head. Assuming that the mold has four sets of mold cavities and the label magazine has two dispensing lanes, the magazine shuttle moves the magazines from a position at which the first and second dispensing lanes of labels are aligned, respectively, with the first and third vacuum label holding head. After t he first an d third vacuum label holding heads remove labels from the first and second dispensing lanes, the magazine shuttle is actuated to move the label magazines to a position such that the first dispensing lane is aligned with the second vacuum label holding head and the second dispensing lane is aligned with the fourth vacuum label holder. The vacuum label holding heads may then be moved into alignment with the respective mold recesses and moved into the recesses to deposit the labels simultaneously in each such recess. The labels supported on adjacent vacuum label holding heads will have overlapped edges with the adjacent labels; however, this does not interfere with the placement by the vacuum label holding heads of their respective labels into the adjacent recesses.

IN THE DRAWINGS

DETAILED DESCRIPTION OF THE INVENTION

Figure 1:
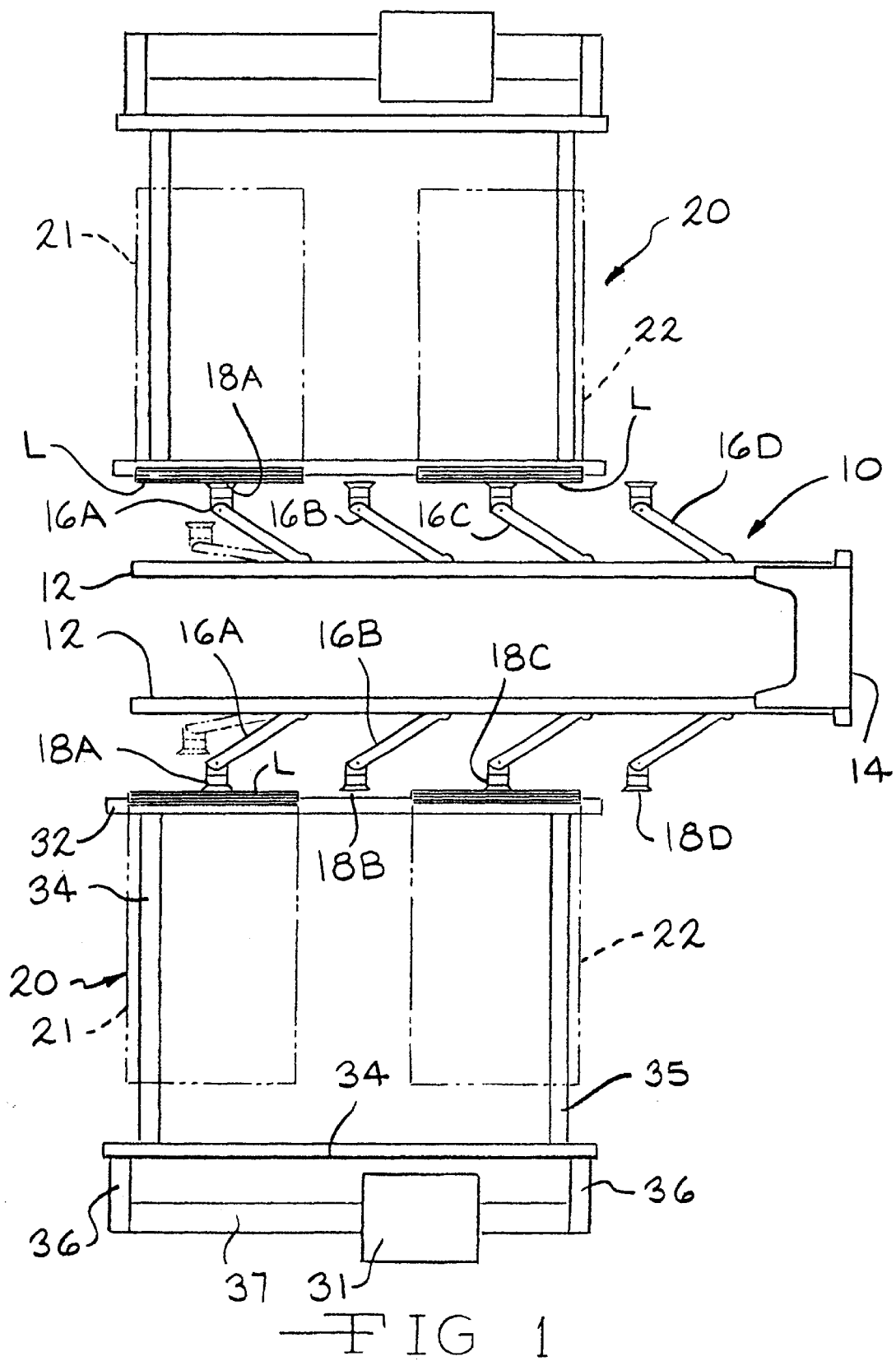
FIG. 1 is a schematic top plan view of opposing, multi-lane label magazines and a four head transfer apparatus for each lane, with the first and third vacuum label holding heads shown engaging labels from, respectively, the first and second lanes.
Figure 2:
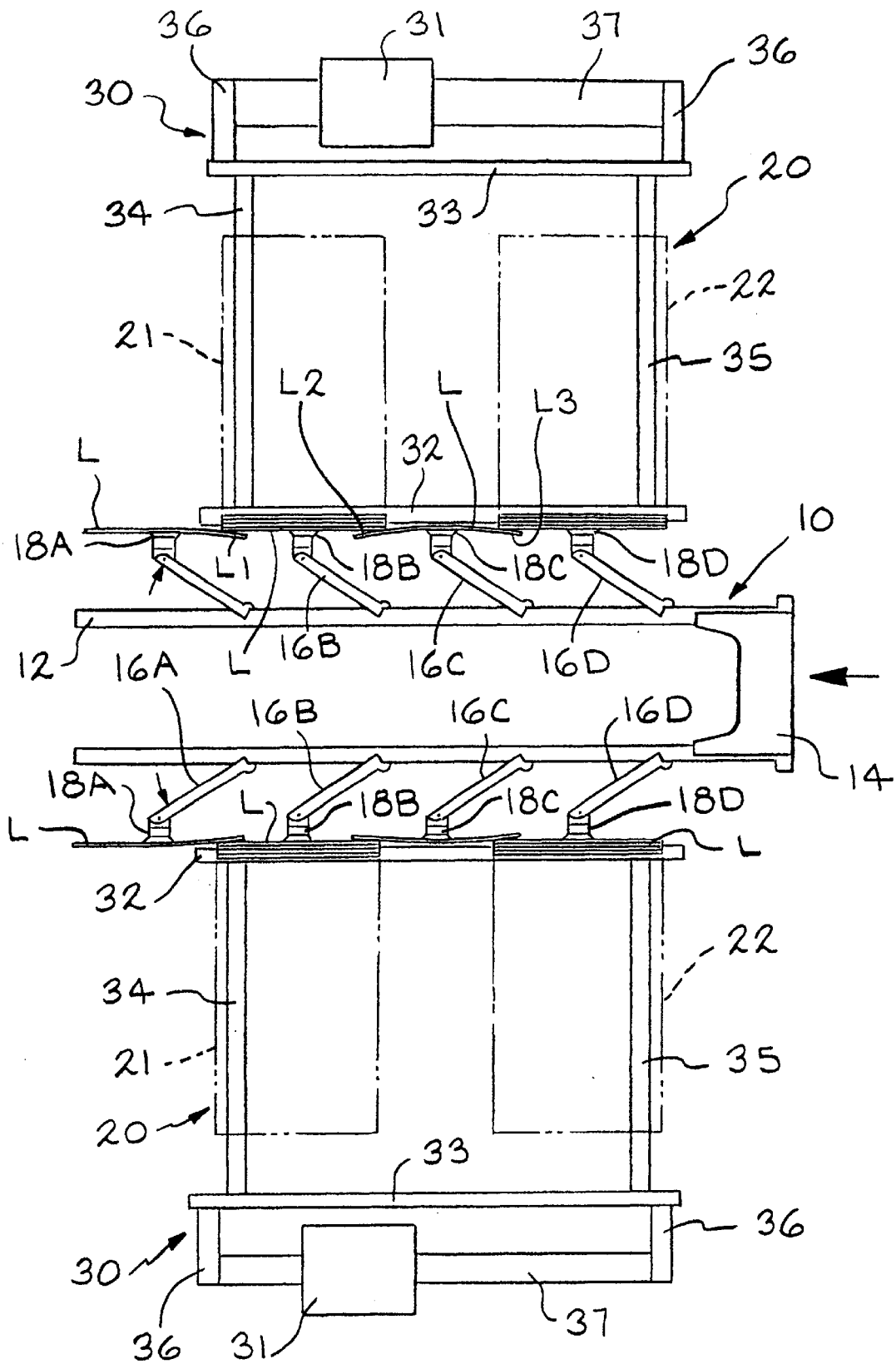
FIG. 2 is a view similar to FIG. 1 but showing the second and fourth vacuum label holding heads aligned with the first and second dispensing lanes, respectively, and positioned to engage and withdraw labels therefrom.

Referring to FIGS. 1 and 2, there is shown a placer arm assembly generally designated by the numeral 10 positioned between a pair of label magazines generally designated by the numeral 20. The label magazines 20 are positioned in opposing relationship facing one another, one on each side of the placer arm assembly 10. Each label magazine 20 has a first lane 21 and a second lane 22 (shown in phantom lines) for holding a supply of labels L, with the end label of each lane 21 and 22 facing the placer arm assembly 10 and being substantially flat and positioned to be withdrawn from that lane of the label magazine 20.

Figure 4:
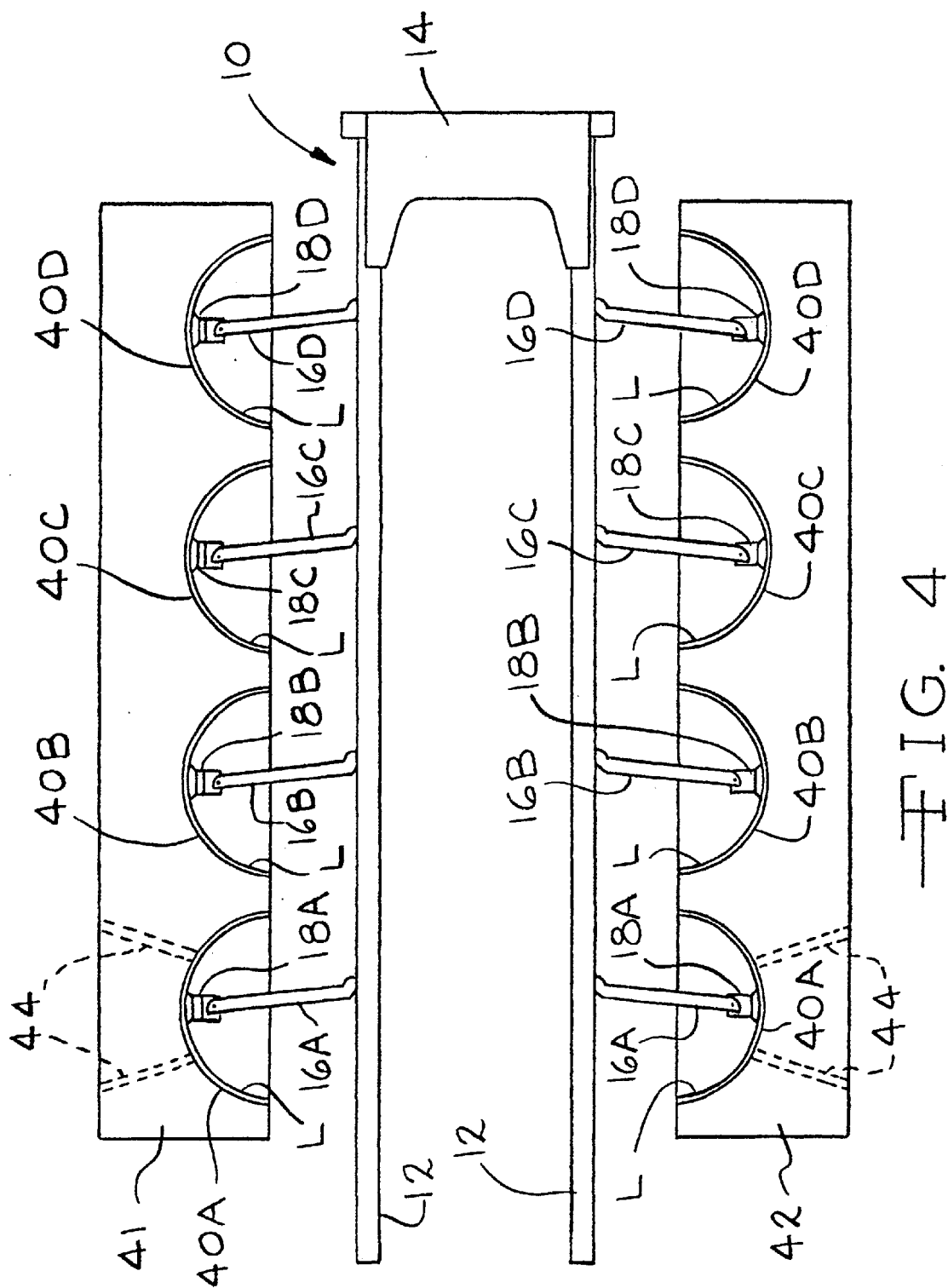
FIG. 4 is a view similar to FIG. 3 showing the labels inserted into the mold recesses.

The placer arm assembly 10 includes a pair of longitudinally extending support members 12, each extending from a base 14 in parallel relationship to one another and parallel to the end labels L of each lane 21 and 22. Each support member 12 has a plurality of placer arms 16. As shown, there are four placer arms 16A, 16B, 16C and 16D on each support member 12. However, there could be a greater or lesser number of placer arms 16 and a greater or lesser number of lanes 21 and 22 for the labels. Preferably, there should be twice as many placer arms 16 as there are label dispensing lanes 21 and 22. Each of the placer arms 16 is pivotally mounted on the respective support members 12 for rotatable movement from a retracted position shown in phantom lines in FIG. 1 to a partially extended label pick-up position shown in full lines in FIGS. 1 and 2. Although only placer arm 16A has been shown in phantom lines in the retracted position, all of the placer arms 16A, 16B, 16C and 16D are mounted to move together about their respective pivot points from a retracted position to a partially extended position for removing labels from the label magazines (FIG. 2) to a fully extended position for inserting labels in the cavities of the mold sections (FIG. 4).

Each placer arm 16A, 16B, 16C and 16D has mounted thereon a vacuum head 18A, 18B, 18C and 18D. As can be seen in FIGS. 1 and 2, when the placer arms are pivotally rotated on the respective support members 12 from the retracted position to a partially extended position, those vacuum heads aligned with one of the dispensing lanes 21 or 22 will engage and withdraw the end label L therefrom. When the magazines 20 are in the position shown in FIG. 1, the placer arm 16A and its vacuum head 18A are aligned with the first lane 21 and the third placer arm 16C and its vacuum head 18C are aligned with the second lane 22. When the magazines 20 are in the position shown in FIG. 2, the second placer arm 16B and its vacuum head 18B are aligned with the first label magazine 21 and the fourth placer arm 16D and its vacuum head 18D are aligned with the second label magazine 22.

As can be readily seen in FIG. 2, the label L supported on the first vacuum head 18A has an end portion L1 which overlaps the end of the adjacent label L about to be withdrawn from the first lane 21 by the second vacuum head 18B. Additionally, the label L supported on the third vacuum head 18C has one end L2 overlapping the label L about to be withdrawn from the first lane 21 and its other end L3 overlapping the label L about to be withdrawn from the second lane L2 by the fourth vacuum head 18D.

Each of the label magazines 20 is mounted on a magazine shuttle mechanism generally designated by the numeral 30. The magazine shuttle mechanism 30 is mounted for reciprocating movement from the position shown in FIG. 1 to the position shown in FIG. 2. The reciprocating movement is powered by a drive mechanism 31 which is mounted in a fixed position relative to a blow molding machine (not shown). The magazine shuttle mechanism 30 includes first and second longitudinally extending members 32 and 33 and first and second laterally extending members 34 and 35, each of which extend between and are connected at their opposing ends to the first longitudinally extending member 32 and the second longitudinally extending member 33. The respective longitudinally extending members 32 and 33 and transversely extending members 34 and 35 are joined together to form a rectangle and provide support for the first label magazine 21 and second label magazine 22.

Extending from opposing ends of the second longitudinally extending support member 33 are a pair of wings 36. Extending between and rigidly mounted on the wings 36 is rack gear 37. The rack gear 37 also extends through the drive mechanism 31 and is engaged by conventional means to a gear (not shown) of the drive mechanism 31. Rotation of the gear of the drive mechanism 31 causes the magazine shuttle mechanism 30 to move from the position shown in FIG. 1 to the position shown in FIG. 2 when the gear is rotated in one direction and from the position shown in FIG. 2 to the position shown in FIG. 1 when the gear is rotated in the opposite direction. In lieu of the drive mechanism 31 and rack gear 37, the shuttle mechanism 30 could be powered by a linear actuator or cylinder.

During the time period in which labels are being removed from the label magazines 21 and 22 as shown in FIGS. 1 and 2, including the period of movement of each of the magazine shuttle mechanisms 30, the base 14 and support members 12 are maintained in a fixed position relative to the respective drive mechanisms 31.

Beginning with the placer arms 16A, 16B, 16C and 16D in a retracted position and the other elements positioned as shown in FIG. 1, an actuation mechanism operably connecting the base 14 to the respective placer arms causes each of the placer arms 16A, 16B, 16C and 16D to rotate relative to their respective support members 12 from the retracted position to the partially extended position shown in FIG. 1, at which position the oppositely disposed vacuum heads 18A will each be positioned to withdraw a label L from its aligned first lane 21 and the vacuum heads 18C will each be positioned to withdraw a label L from its aligned second lane 22. Such withdrawal of the labels L from their respective lanes 21 and 22 will occur upon movement of the placer arms from the partially extended to the retracted position. During such rotation of the placer arms 16A, 16B, 16C and 16D, each of the heads 18A and 18C will carry a label L supported thereon by vacuum, as is well known in the art. With the placer arms 16A, 168, 16C and 16D now in the retracted position, the drive mechanism 31 is actuated to move the shuttle mechanism 30 from the position shown in FIG. 1 to the position shown in FIG. 2. Upon reaching the position shown in FIG. 2, the actuation mechanism causes the placer arms 16A, 16B, 16C and 16D to again move to a partially extended position so that vacuum heads 18B are aligned with their respective first lanes 21 and vacuum heads 18D are aligned with their respective second lanes 22, at which position each of the vacuum heads 18B and 18D engages the end label from its aligned lane. The actuation mechanism then causes the placer arms 16A, 16B, 16C and 16D to be moved to the retracted position with each of the vacuum heads 18A, 18B, 18C and 18D having a label L supported thereon. As previously discussed, the labels L supported on heads 18B will be in overlapping relationship with the labels L supported on heads 18A and 18C and the labels L supported on heads 18C will be in overlapping relationship with the labels L supported on heads 18B and 18D. The placer arm assembly 10, with the labels L supported on the respective vacuum heads, is now ready to be moved to a position between the open halves of a partible blow mold. The mechanism for accomplishing such movement is well known in the art and does not form a part of this invention.

Figure 3:
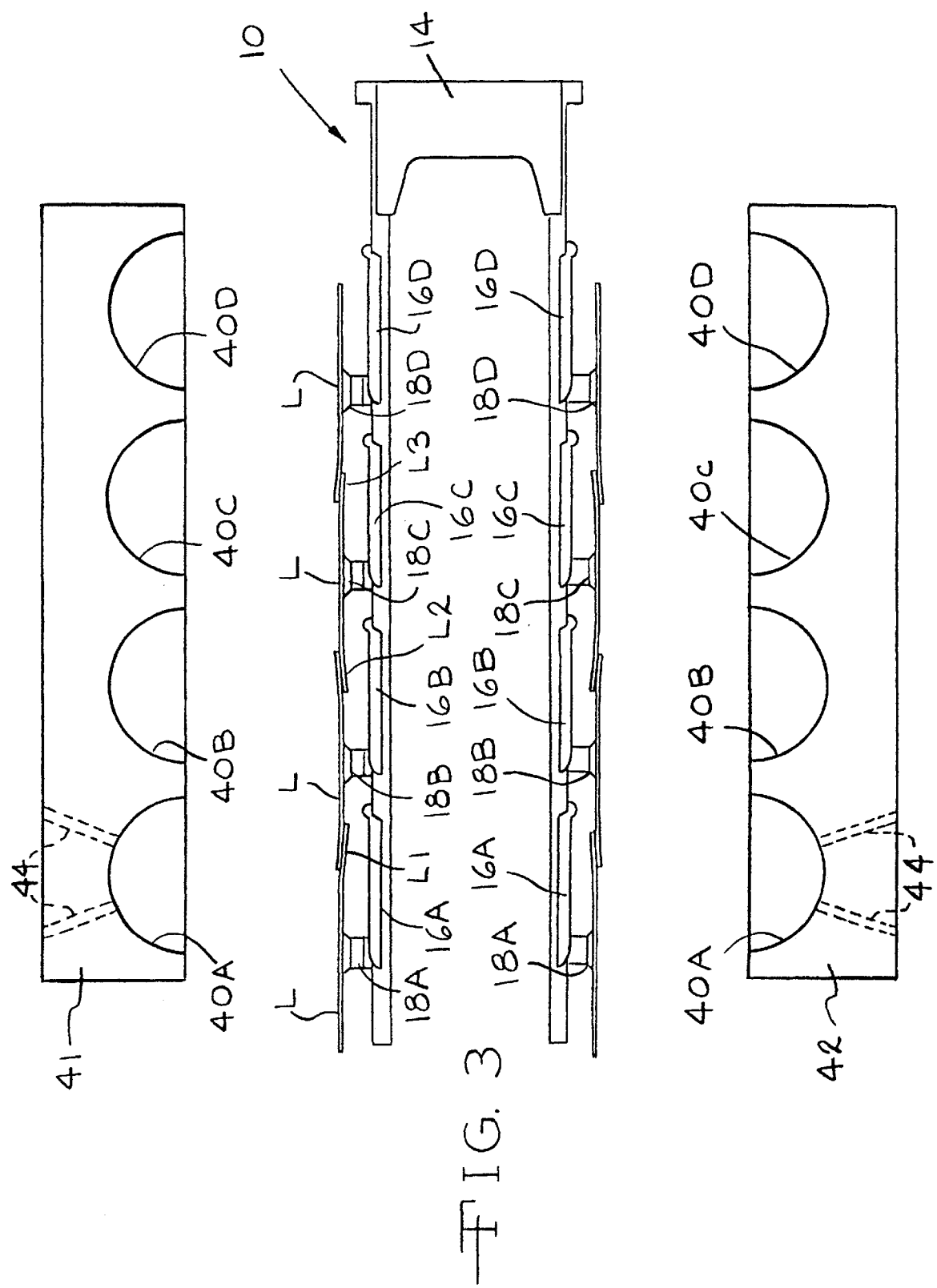
FIG. 3 is a schematic view showing the label transfer mechanism moved to a position between a pair of open mold halves with each of the vacuum label holding heads in a position ready to insert the labels into their respective aligned mold recesses.

Referring to FIGS. 3 and 4, the placer arm assembly 10 is shown positioned between the open sections 41 and 42 of a partible blow mold. Each mold section 41 and 42 has a plurality of recesses 40A, 40B, 40C and 40D. As can be seen, each of the recesses has a semi-circular cross-sectional configuration such that, when the mold sections 41 and 42 are closed, each of the recesses 40A, 40B, 40C and 40D defines with its opposing recess 40A, 40B, 40C or 40D, a cylindrical cavity in which the body portion of the bottle to be formed therein may be blown. Each of the vacuum heads 18A, 18B, 18C and 18D is aligned such that when the placer arms 16A, 16B, 16C and 16D are actuated and pivotely rotated to the fully extended position shown in FIG. 4, the vacuum heads 18A, 18B, 18C and 18D will have inserted a label L into each of the respective recesses 40A, 40B, 40C or 40D aligned therewith. Following positioning of the labels L in each of the recesses 40A, 40B, 40C and 40D, the vacuum to each of the heads is discontinued to release the labels therefrom. The labels L are retained in the recesses 40A, 40B, 40C and 40D by vacuum introduced through passageways 44 communicating with each recess. The placer arms are then moved to the retracted position and the placer arm assembly is moved to the position shown in FIG. 1 to begin a new cycle of removing labels L from the label magazines 21 and 22 and transferring them to the mold sections 41 and 42.

As can be seen in FIG. 4, each label L has a length which results in it extending the full circumferential extent of the recess 40A, 40B, 40C or 40D in which it is positioned such that a section taken therethrough will define a semi-circle. As a result, when the mold sections 41 and 42 are closed to define a cavity and a bottle is formed in such cavity, the label L will extend completely around the cylindrical portion of the bottle formed in each of the recesses 40A, 40B, 40C or 40D.

Although the present invention has been described with a mold having four cavities and with an in-mold labeling mechanism having four vacuum heads for withdrawing labels from a dispensing magazine having two lanes of labels, it will be readily recognized that the invention is suitable for use with a mold having a greater or fewer number cavities, of vacuum heads and of lanes. There should be an equal number of vacuum heads as cavities. Preferably, but not absolutely necessarily, there should be at least twice as many vacuum heads as there are lanes of labels in the dispensing magazine. If there are an odd number of mold cavities and vacuum heads, the number of lanes will preferably be at least equal to one-half of the sum of 1+the number of vacuum heads.

Modifications will be readily apparent to those skilled in the art. Accordingly, the scope of the present invention should be limited only by the scope of the claims appended hereto.

I claim:

1. A method for dispensing labels from a label magazine to first and second label transfer mechanisms comprising the steps of:
    (a) aligning said label magazine and said first label transfer mechanism;
    (b) providing relative movement in a first direction between said label magazine and said first label transfer mechanism and gripping a first label with said first label transfer mechanism;
    (c) providing relative movement between said label magazine and said first label transfer mechanism in a second direction lateral to said first direction to align said label magazine with said second label transfer mechanism such that a portion of said first label supported on said first label transfer mechanism is aligned with said label magazine;
    (d) imparting relative movement between said magazine and said second label transfer mechanism toward one another; and
    (e) causing said second label transfer mechanism to remove a second label from said magazine while said first label remains engaged on said first label transfer mechanism in overlapping relationship to said second label.

2. A method for positioning a label in each of a plurality of first recesses of a first mold section, said first mold section having a mating second mold section closeable therewith, said second mold section having second recesses, each of which cooperates with one of said first recesses when said first and second mold sections are closed to define a cavity having a cylindrical portion, said first recesses being spaced apart from one another with the center-to-center distance between adjacent first recesses being less than one-half the circumference of a cylinder defined by said cylindrical portion, comprising the steps of:
    (a) providing first, second, third and fourth label engaging heads, said label engaging heads being spaced apart from adjacent heads a distance substantially equal to said center-to-center distance;
    (b) providing a label dispenser for dispensing the end label from each of a pair of spaced apart lanes, the center-to-center spacing between said lanes being twice as great as the distance between adjacent label engaging heads;
    (c) engaging the end label of each of said spaced apart lanes with said first and third label engaging head, respectively; and
    (d) thereafter engaging the end label from each of said spaced apart lanes with said second and fourth label engaging head, respectively.

3. The method of claim 2 wherein said label dispenser is shifted from a position in which the lanes of said label dispenser are aligned, respectively, with said first and third label engaging heads to a position in which said lanes are aligned, respectively, with said second and fourth label engaging heads prior to step (d).

4. The method of claim 2 wherein said labels retained on said heads overlap labels retained on adjacent heads.

5. A method for positioning a label in each of first and second recesses of a first mold section, said first mold section having a mating second mold section closeable therewith, said second mold section having third and fourth recesses, each of which cooperates with one of said first and second recesses when said first and second mold sections are closed to define a cavity having a cylindrical portion, said first recess being spaced apart from said second recess with the center-to-center distance between said first recess and said second recess being less than one-half the circumference of a cylinder defined by said cylindrical portion, comprising the steps of:

(a) providing first and second label engaging heads, said first label engaging head being spaced apart from said second label engaging a distance substantially equal to said center-to-center distance;

(b) providing a label dispenser for dispensing the end label contained therein;

(c) engaging a first end label with said first label engaging head;

(d) shifting said label dispenser from a position in which said first end label is aligned for engagement by said first label engaging head to a position in which a second end label is aligned for engagement by said second label engaging head, a portion of said first end label supported on said first label engaging head being aligned with a portion of said second end label; and (e) thereafter engaging said second end label from said label dispenser with said second label engaging head such that a portion of said first end label supported on said first label engaging head overlaps said second end label.

6. Apparatus for positioning a plurality of labels simultaneously in a plurality of molding recesses of a mold section, said recesses each defining, in part, a semi-circle, said recesses having a center-to-center spaced apart distance less than the arcuate length of said semi-circle comprising:

(a) a plurality of label retaining heads spaced apart a distance substantially equal to said center-to-center spacing of said recesses;

(b) a label magazine having at least two lanes, said lanes being spaced apart a distance twice as great as the distance between said label retaining heads;

(c) a shuttle mechanism for moving said label magazine from a position in which said lanes are aligned with a first set of alternate ones of said retaining heads to a position in which said lanes are aligned with a second set of alternate ones of said retaining heads;

(d) an actuator for moving said first set of retaining heads into engagement with a label in each said lane when aligned therewith and said second set of retaining heads into engagement with a label in each lane when aligned therewith; and (e) a transfer mechanism for transferring said retaining heads with labels thereon to said mold recesses.

7. A method for positioning a label in each of a plurality of first recesses of a first mold section, said first mold section having a mating second mold section closeable therewith, said second mold section having second recesses, each of which cooperates with one of said first recesses when said first and second mold sections are closed to define a cavity having a cylindrical portion, said first recesses being spaced apart from one another with the center-to-center distance between adjacent first recesses being less than one-half the circumference of a cylinder defined by said cylindrical portion, comprising the steps of:

(a) providing a plurality of label engaging heads;

(b) providing a label dispenser for dispensing the end label from each of a pair of lanes, (c) engaging the end label of each of said lanes with engaging heads;

(d) causing labels engaged by adjacent label engaging heads to overlap; and (e) inserting labels in each of said first recesses.

* * * * *